Figure 10:
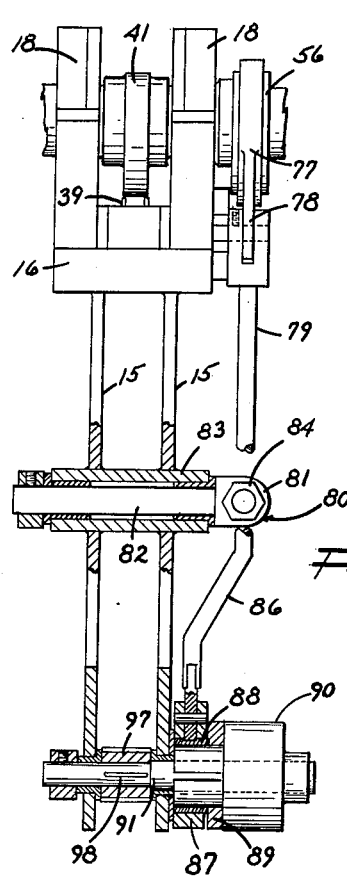

Dec. 13, 1955　　　　A. P. KNAPP　　　　2,726,617
MOBILE BONDING MACHINE
Filed May 9, 1952　　　　　　　　　　　　5 Sheets-Sheet 1
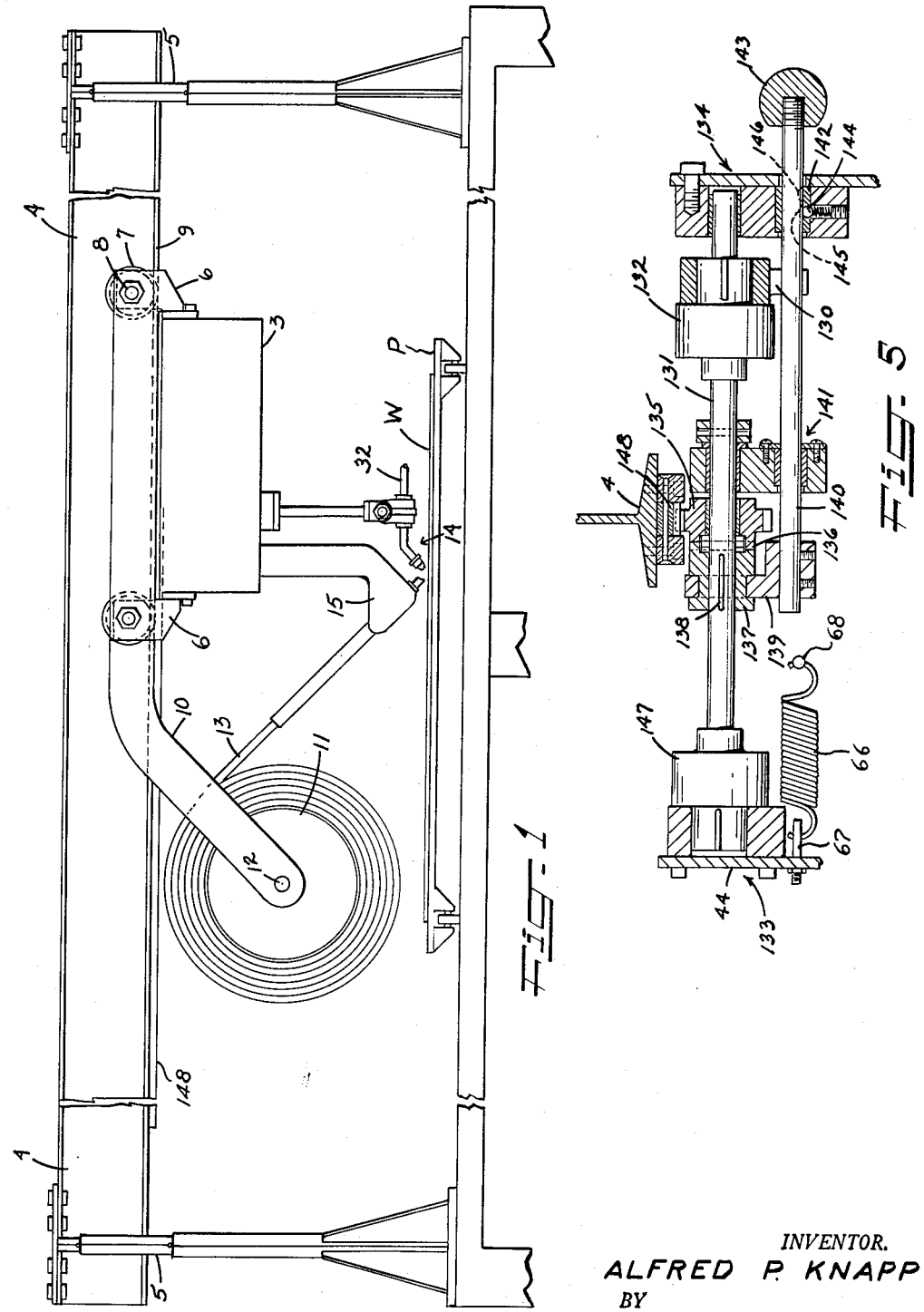
INVENTOR.
ALFRED P. KNAPP
BY
Thomas B. O'Nally
ATTORNEY.

Dec. 13, 1955     A. P. KNAPP     2,726,617
MOBILE BONDING MACHINE
Filed May 9, 1952     5 Sheets-Sheet 2
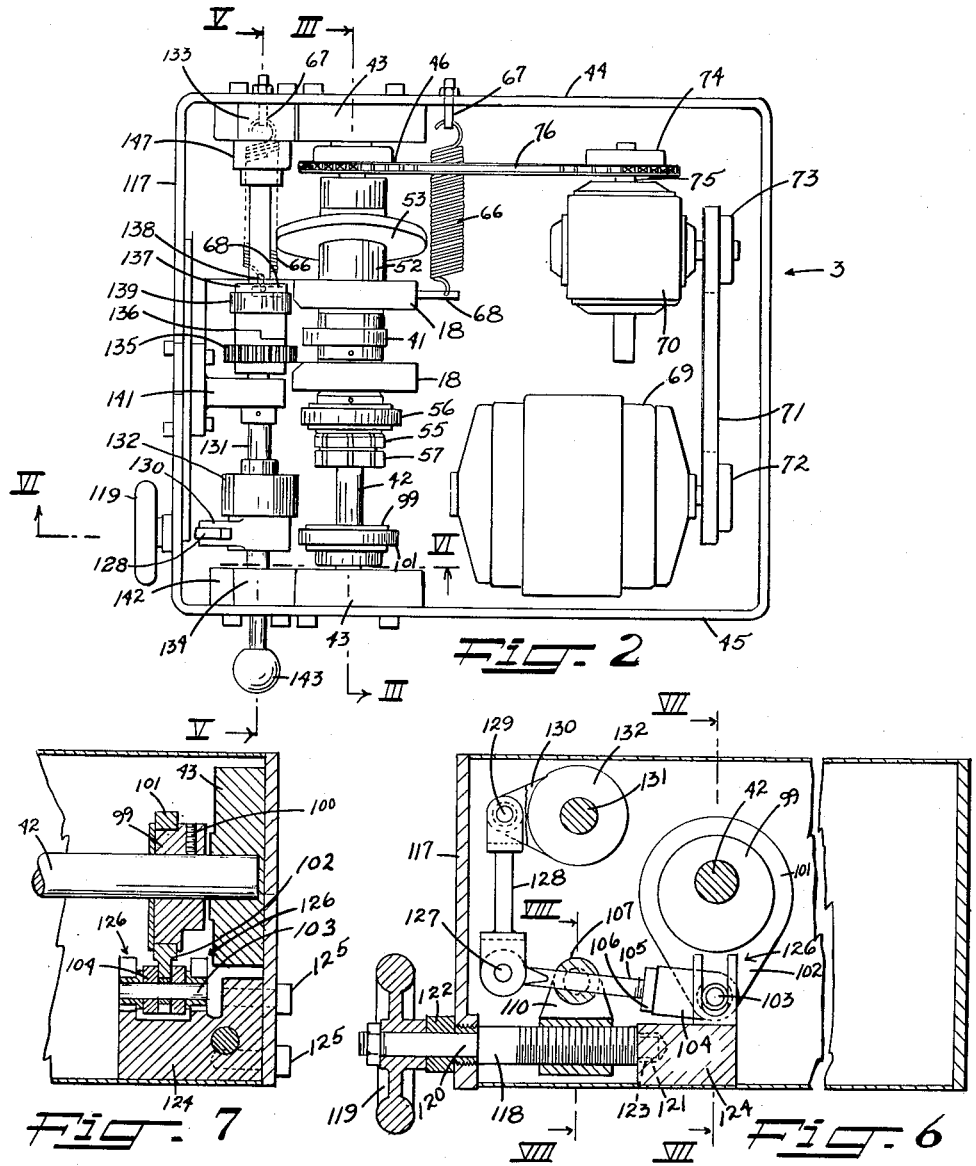
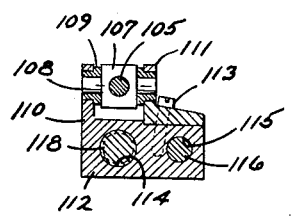
INVENTOR.
ALFRED P. KNAPP
BY
Thomas R. McNally
ATTORNEY.

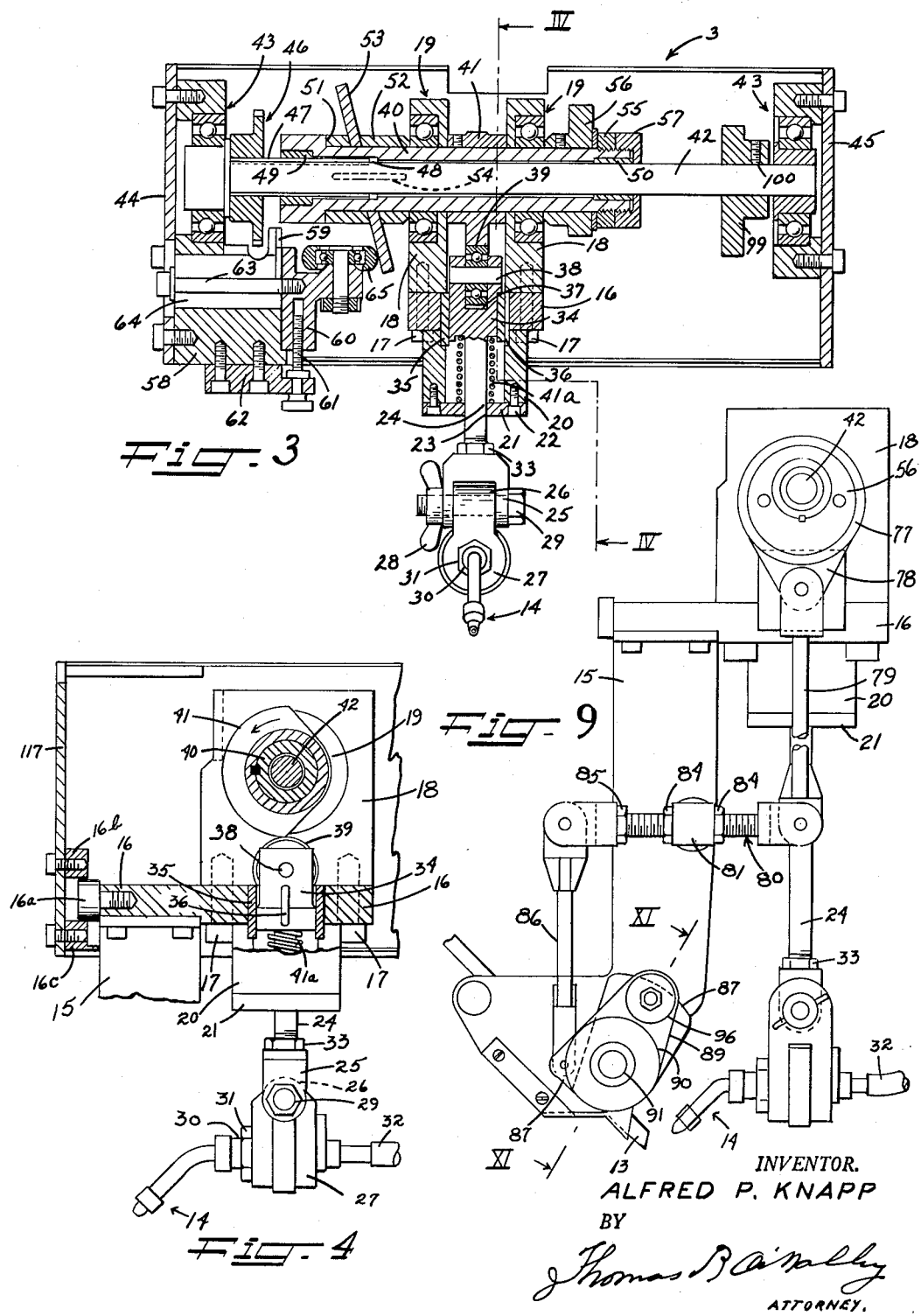

Dec. 13, 1955  A. P. KNAPP  2,726,617
MOBILE BONDING MACHINE
Filed May 9, 1952  5 Sheets-Sheet 4

INVENTOR.
ALFRED P. KNAPP
BY
Thomas R. O'Malley
ATTORNEY.

Dec. 13, 1955  A. P. KNAPP  2,726,617
MOBILE BONDING MACHINE
Filed May 9, 1952  5 Sheets-Sheet 5
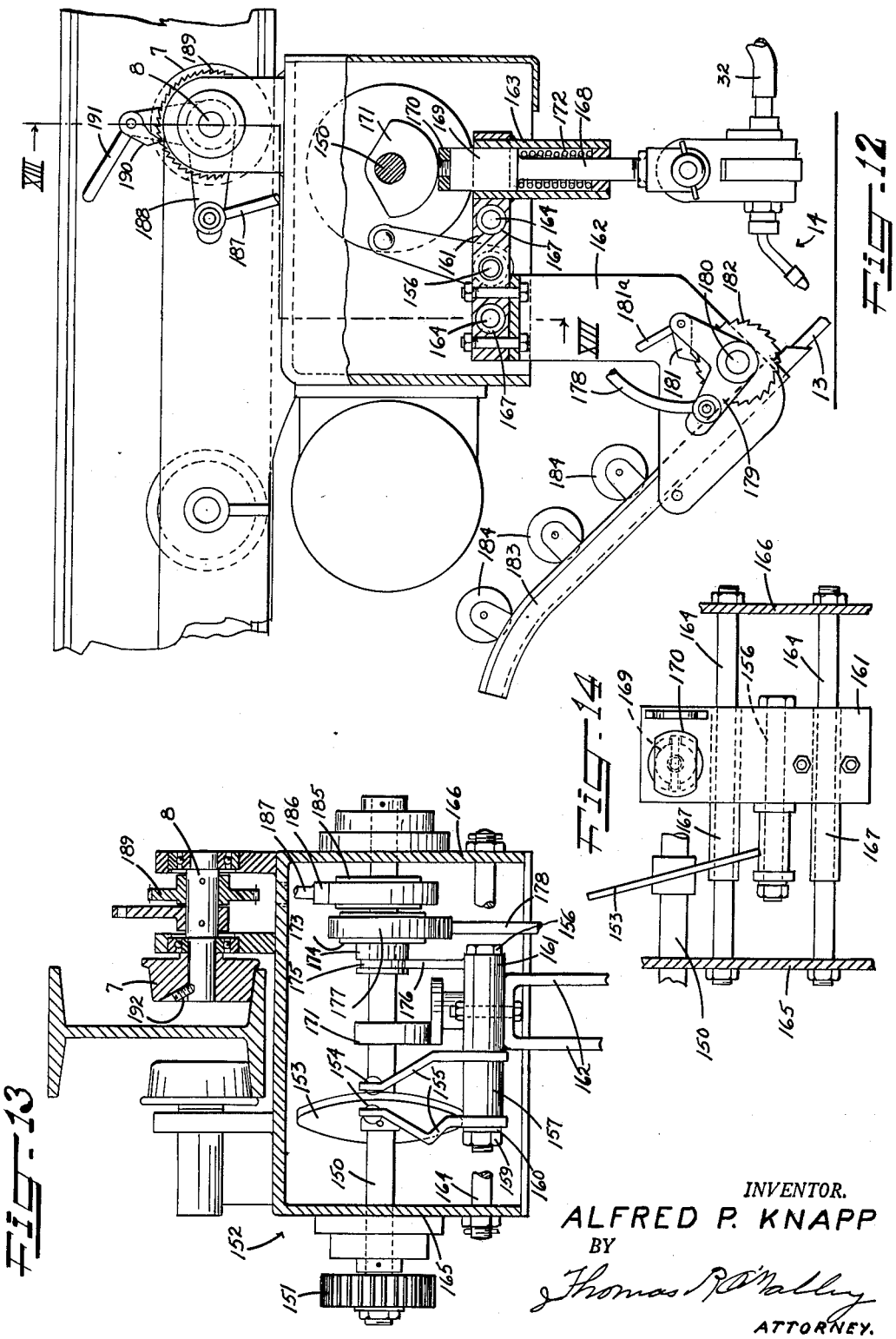
INVENTOR.
ALFRED P. KNAPP
BY
Thomas R. O'Malley
ATTORNEY.

United States Patent Office 2,726,617
Patented Dec. 13, 1955

2,726,617

MOBILE BONDING MACHINE

Alfred P. Knapp, Long Island City, N. Y., assignor to American Viscose Corporation, Philadelphia, Pa., a corporation of Delaware Application May 9, 1952, Serial No. 287,070

7 Claims. (Cl. 113—59)

The present invention relates to an improved machine for bonding or cladding structural units, particularly large and heavy tanks or vessels. The term bonding as used herein is intended to cover generically the joining of two pieces of material by the application of a fusible material in the manner of the processes generally referred to as welding and lead burning, as well as to the building up of a coating of the fusible metal upon the surface of another material, especially another metal, as in cladding.

It is an object of the present invention to provide an improved bonding machine which is simple, compact, and efficient. A further object is to provide a compact bonding machine which is particularly adapted to be automatically moved along the work to be bonded. Other objects and advantages of the invention will be apparent from the drawing and the description thereof hereinafter.

Figure 11:
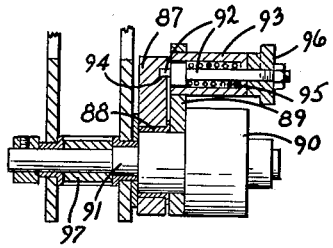

In the drawing,

Figure 1 is a side elevation showing the general arrangement of the machine and a workpiece relative to which the machine is moved during bonding, Figure 2 is a plan view of the mechanism in the main housing, Figure 3 is a section through the main drive shaft on line III—III of Figure 2, Figure 4 is a section on line IV—IV of Figure 3, Figure 5 is a section on line V—V of Figure 2, Figure 6 is a section on line VI—VI of Figure 2, Figure 7 is a section on line VII—VII in Figure 6, Figure 8 is a section on line VIII—VIII in Figure 6, Figure 9 is an enlarged view of the fusible rod-feeding sub-assembly, Figure 10 is an end view of the fusible rod-feeding assembly, Figure 11 is a section on line XI—XI of Figure 9, Figure 12 is a side elevation partly in section showing a modification, Figure 13 is a vertical transverse section taken on the line XIII—XIII in Figure 12, and Figure 14 is a fragmentary detail in plan of the sub-carriage of Fig. 12.

The invention comprises essentially the provision of a compact unitary housing for all the control mechanism pertaining to the torch and the fusible material feeding means. The driving connections are so arranged that the desired travel of the housing or carriage, the vertical oscillation of the torch, the horizontal reciprocatory motion of the torch and fusible material feeding means, and the feed of the fusible material are all accomplished through simplified driving connections from a single source of power. In the preferred form the source of power is a motor incorporated in the housing on the carriage.

As shown in Figs. 1 and 2, the mobile bonding machine comprises a carrier or housing 3 supported on a longitudinal supporting member 4 which may take the form of an I-beam and may be supported at each end by suitable vertically adjustable posts 5. At each end of the housing 3, there is provided a pair of brackets 6 which extend upwardly and support the rollers 7 on the stub shafts 8 which project from the brackets 6 inwardly toward each other so that the rollers 7 ride on opposite sides of the bottom flange 9 of the I-beam. A pair of arms 10 extend backwardly from the brackets and rotatably support between them a reel 11 of fusible material, such as a flexible rod or wire 13 thereof, mounted on the shaft 12. As shown, the arms 10 may be secured to the brackets 6 to provide a rigid support for the reel so that the axis of the latter is fixed relative to the housing 3. The housing 3 contains the mechanism hereinafter more particularly described for imparting proper motions to the torch or burner 14 and the fusible rod-supporting bracket 15, both of which are appropriately suspended from the housing as will be more particularly described hereinbelow.

*Sub-carriage for supporting the torch and fusible rod*

As shown in Fig. 4, the bracket 15 for supporting the fusible rod and its feeding mechanism is secured to a plate or carrier 16 which in turn is secured by cap screws 17 to laterally spaced upright plates 18 which contain bearings 19. Beneath the plate 16 there is secured, such as by welding, a cylindrical shell 20 having its axis extending vertically below the axis of the bearings 19. A circular cap 21 is secured as by screws 22 to the bottom of the shell 20 and the cap has a bore 23 adapted to receive reciprocably therein a rod or hanger 24 to the bottom of which there is secured the torch 14. This securement may be by means of a yoke 25 straddling the projection 26 of the torch supporting sleeve 27. The wing nut 28 and bolt 29 permit angular adjustment of the torch holding sleeve 27 about the axis of the bolt 29 and the torch tube is adapted to be rigidly supported in the sleeve 27 such as by the ferrule 30 and the locknut 31. The flexible tube 32 is adapted to deliver the appropriate gas to the torch or burner 14. The yoke 25 is vertically adjustable along the rod 24 by means of the threaded connection and the locknut 33.

The upper end of the rod 24 is provided with an enlargement in the form of a plunger 34 having a sliding fit in a bore in the plate 16 bushed as at 35. A key 36 is provided between the bushing 35 and the plunger 34 so as to prevent the burner support from rotating about the axis of rod 24. The plunger 34 is recessed at 37 and a cam follower roller 38 is rotatably supported on a pin 39 extending across the recess 37.

The carriage sub-assembly and sub-carriage comprising the plate 16 and upright plates 18 comprises also a sleeve 40 within the bearings 19 and provided with a cam 41 therebetween. The sleeve 40 of the sub-assembly is supported on the shaft 42, the ends of which are supported in suitable bearings 43 carried on the opposite side walls 44 and 45 of the housing 3. A sprocket 46 is keyed to the shaft 42 by the key 47 and the sleeve 40 is slidable axially of the shaft 42, the key 47 extending into the keyway 48 of the sleeve 40 which is slidable on the key and shaft 42. Bushings 49 and 50 are provided between sleeve 40 and the shaft 42 and the sleeve 40 is enlarged at the left end as viewed in Fig. 3 to provide a shoulder 51. Between the shoulder 51 and one of the bearings 19, the hub 52 of a skew plate or wobble plate 53 is disposed. This skew plate is keyed to the sleeve 40 at 54. Between the other bearing 19 and a lock nut 55 there is disposed an eccentric 56. A cap 57 may be provided on the end of sleeve 40 to retain the bushing 50.

Fixed to the wall 44 of the housing 3 is a block 58 having a vertical guideway 59. Within this guideway, a roller-supporting bracket 60 is mounted. A screw 61 rotatably mounted in a bracket 62 beneath the housing provides a vertical adjustment for the roller support 60 along guideway 59. A screw 63 extends through a slot 64 in the block 58 and serves to clamp the block 60 to block 58 when the desired vertical adjustment has been made by the screw 61. The purpose of this vertical adjustment is to vary the throw of the sub-assembly or carriage comprising the sleeve 40 axially of the shaft obtained by the skew plate 53 which bears against the roller 65 carried on the block 60. Springs 66 (Fig. 2), secured to lugs 67 fixed on wall 44 and to projecting rods 68 on one of the upright plates 18, urge the carriage, sub-assembly, or sub-carriage comprising sleeve 40 to the left as viewed in Fig. 3.

As shown in Figure 4, rollers 16a are mounted on one end of plate 16 and ride freely between the guide rails 16b and 16c fixed on one end wall 117 of the main carrier or housing 3.

As shown in Fig. 2, sprocket 46 is driven by the motor 69 through a reducer 70 connected to the motor by a chain 71 and sprockets 72 and 73 and through the sprocket 74 fixed to the output shaft 75 of the reducer 70, which sprocket 74 drives a chain 76 engaging sprocket 46.

The main drive shaft 42, by rotating the skew plate 53, reciprocates the sub-carriage carrying the torch and fusible-rod-feed supporting device axially of the shaft 42 and at the same time it drives the cam 41 which reciprocates the blowtorch vertically relative to the work and the fusible rod-supporting bracket.

Fusible-rod feeding mechanism

The eccentric 56 drives the device for feeding the fusible rod as shown more particularly in Figs. 9 to 11. The eccentric strap or yoke 77 comprises the lug 78 which is connected by the link 79 to a walking-beam type of lever 80 comprising essentially a threaded rod extending through an unthreaded bore in the terminal head 81 of the fulcrum or pivot pin 82. The pin 82 is rotatably mounted in a fixed sleeve 83 extending transversely through the arms 15. The locknuts 84 on opposite sides of the head 81 permit an adjustment of the relative lengths of the lever 80 extending from opposite sides of the axis of pivot pin 82 while the end of lever 80 shown at the right in Fig. 9 may be integral with the yoke head which is connected to the link 79. The other end is threaded and screwed into a bore in the yoke at the left end and the relative position between the yoke and the lever 80 is fixed by a locknut 85. The lever 80 is connected by the link 86 to a member 87 which is rotatable freely about the bushing 88.

A plate 89 is secured to the drive-receiving member of a one-way clutch 90 carried on shaft 91 for transmitting one-way rotation to the shaft. A latch 92 supported in a sleeve 93 carried on the member 89 is normally urged into a recess 94 in the member 87 by a spring 95 within the sleeve 93. The latch may be released manually by pulling on the knob 96. A fluted or narrowed feeding roll 97 is keyed to the shaft 91 at 98 and is driven in feeding direction by the downward stroke of link 86 which is transmitted through the one-way clutch 90, the return or upward stroke of link 86 having no effect since the one-way clutch slips during such return stroke. The amount of intermittent feed provided by this linkage can be adjusted by means of the shifting of locknuts 84 along the lever 80.

Mechanism for driving the housing (main carrier)

The main driving shaft 42 also carries an eccentric 99 fixed thereto as by a set screw 100 for driving the main carriage along the supporting I-beam. As shown in Figs. 2 and 5 to 7, an eccentric strap 101 is carried by the eccentric 99 and has a lug 102 through the bore of which a pin 103 extends. This pin links the lug 102 to the yoke 104 of a lever 105, the length of the link being adjustable by means of the threaded connection between its main shank and yoke 104, the adjustment being set by means of the locknut 106. Lever 105 extends slidably through a pivot nut 107 having trunnions 108 which may be provided with bushings 109 (Fig. 8) to provide improved bearing relationship between the trunnions 108 and the bores of the opposed upright bearings 110 and 111. As shown in Fig. 8, the bearing 111 is fixedly secured to the base 112 from which the other bearing 110 projects upwardly by means of a cap screw 113. The base 112 has a threaded bore 114 and a smooth bore 115. A smooth guide rod 116 extends horizontally from the end wall 117 of the housing 3 parallel to the adjusting screw 118 provided with the handle 119 outside the housing. The screw 118 has reduced diameter ends 120 and 121 of smooth peripheries which permit rotation within a suitable bearing 122 provided in the wall 117 and in bearing 123 provided in a block 124 fixedly secured to the housing by any suitable means, such as cap screws 125. The block 124 is provided with an upstanding U-shaped projection 126 providing a slot within which the pin 103 is freely rotatable and movable in a vertical direction.

The link 105 is pivotally connected at 127 to a link 128 which in turn is pivotally connected at 129 to the ear of a crank 130 connected to a shaft 131 through a one-way clutch 132 (see particularly Fig. 6) so as to drive the shaft on one stroke only. The shaft 131 is supported in bearings 133 and 134 in the walls 44 and 45 respectively of the housing 3. A spur gear 135 (Figs. 2 and 5) is freely rotatably mounted on the shaft 131 and is provided with clutch teeth at its left side 136. A clutch element 137 is slidably keyed at 138 to the shaft 131 under the control of the yoke 139 carried on a manual shift rod 140 extending through suitable bearings 141 and 142 through the wall 45 and provided on its outside end with a handle 143. A detent ball 144 may be provided in one of the bearings such as 142 and may be adapted to engage spaced depressions 145 and 146 to maintain the clutch in engaged and disengaged positions respectively. The left end of the shaft 131 may be provided with a one-way clutch 147 for the purpose of preventing any tendency for the shaft 131 to exert a return motion. However, this one-way clutch may be omitted. It will be seen that when the clutch element 137 engages the clutch teeth at 136, the shaft 131 will drive the gear 135 which engages the teeth of a rack 148 secured to the bottom of the I-beam 4.

Operation

In operation, the attendant lights the torch and disposes the machine at the proper relative position such as at one end of the work piece W which, as shown in Fig. 1, may be a flat plate disposed on the floor or, if desired, on a suitable platform P which may be automatically moved relative to the machine if desired, such as in a horizontal direction at right angles to the direction of movement of the machine along the work W. By disengaging the clutch 137 by means of the handle 143, the machine can be shifted along the supporting member 4 to any desired starting position without interference or resistance. When the attendant has thus properly positioned the machine relative to the work, he merely turns on the motor for which a suitable switch may be provided on the housing 3 and pulls out the handle 143 to the clutch. The latch 92 on the fusible material feed mechanism is engaged in its bore in the member 87. The motor drives the main shaft 42 which through the skew plate 53 oscillates the sub-carriage comprising the sleeve 40 and carrying both the torch 14 and the fusible rod-feeding mechanism in a direction transverse of the length of the supporting member 4. During this reciprocation of the fusible rod and torch, the cam 41 in cooperation with the spring 41a which urges the roller 39 on plunger 34 against the cam 41 reciprocates the torch vertically. The shaft 42 through the eccentric 56 intermittently feeds the fusible rod and the eccentric 99 intermittently moves the housing 3 carrying the whole machine longitudinally of the I-beam 4. The relative motions are very similar to the operations that would be normally executed by a workman during manual lead burning or bonding operations. The torch while close to the work moves sidewise. The flame moves with the lower end of the fusible rod and causes a small portion of the rod to be melted which drops onto the work while the latter is stationary. As the burner starts to move upwardly, the machine starts to move relative to the work. During the period in which the torch moves away from and again approaches the work, the machine has been advanced the desired distance for the next deposit such as from ⅛ to ½ of an inch, this advancement being adjustable as described hereinbefore. Also while the machine is moved relative to the work and during the interval in which the torch is in its movement away from and then back toward the work, the fusible rod is moved lengthwise so that its tip is in position close to the work for the next melting operation while the torch is close to the work. This operation is repeated cyclically. While in the embodiment described, the machine moves relative to the work, if desired, the machine may be supported in fixed position as by means of suitable pedestals secured to the housing 3 and the supporting member 4 may be movably mounted relative to the housing 3 such as by having the upper flanges of the I-beam rest upon the rollers 7 and the work-piece may be fixedly suspended from the I-beam.

A modification is shown in Figs. 12, 13 and 14.

The main drive shaft 150 is driven by means of a gear 151 outside the housing or carrier 152. The shaft carries a skew plate 153 which cooperates with a pair of opposed follower rolls or balls 154 carried on the arms 155 secured by a bolt 156 and spaced apart a fixed distance by means of the spacer sleeves 157 and the nut and lock washer 159 and 160 respectively. The bolt 156 extends through a bore in the platform 161 to which is bolted the inverted U-bracket having the arms or hanger 162 for carrying the burner and feed. The platform or carrier 161 is also provided with a sleeve 163 extending vertically through such platform. The platform 161 is slidably mounted upon a pair of guide rods 164 which may be suitably supported such as by the end walls 165 and 166 of the housing 152. If desired, the bushings 167, 167 may be provided in the bores of the platform 161 to improve the sliding qualities with respect to the rods 164. Within the sleeve 163, there is vertically reciprocably mounted a rod or hanger 168 which terminates in a plunger 169 having at its upper end an enlarged plate 170 adapted to cooperate with the cam 171 which is keyed to the shaft 150. A spring 172 within the shell 163 normally urges the rod 168 upwardly and thereby keeps the plate 170 against the cam 171. The lower end of the rod 168 carries the torch 14 and its supporting brackets which may be constructed as shown in the first embodiment described hereinabove.

In this embodiment, an eccentric 173 is freely rotatably mounted on the shaft 150 and is provided at its left face (as viewed in Fig. 13) with clutch teeth adapted to be engaged by the clutch element 174. The clutch element 174 is keyed slidably to the shaft 150 so that it is rotated thereby and has a groove 175 engaged by the yoke 176 which is fixed to the platform 161 so that when the skew plate 153 shifts the sub-assembly to the right as viewed in Fig. 13, the clutch 174 engages the eccentric 173 and drives it whereas when the skew plate shifts the platform 161 to the left, the clutch 174 is disengaged and the eccentric 173 is not driven. Eccentric 173 is provided with a strap 177 which in turn is connected by a rod 178 to one arm of a bell crank 179 pivotally mounted on a shaft 180. The other arm of the bell crank carries a pawl 181 which engages a ratchet 182 which is fixed to the shaft 180 so as to drive it when the ratchet is rotated by the pawl 181. A weighted projection 181a may be secured to the pawl to urge it against the ratchet teeth. Shaft 180 is provided with a narrowed or fluted feed roll similar to the roll 97 of the previous embodiment, which roll engages and feeds the rod 13. The rod 13 may pass through an angle iron channel 183 and it may be guided and retained therein by the rollers 184.

The shaft 150 also carries fixedly secured thereon an eccentric 185 provided with an eccentric strap 186 secured to a rod 187 which is pivotally connected to one arm of a bell crank lever 188 pivotally mounted and pivotally rotatable on a shaft 8 of one of the rollers 7. A ratchet 189 is secured to the shaft 8 to which the corresponding roller 7 is keyed as at 192. The other arm of the bell crank lever 188 carries a pawl 190 which is weighted by the projection 191.

The motions executed by this embodiment are similar to those described in the previous embodiment.

It is to be understood that changes and variations may be made without departing from the spirit and scope of the invention as defined in the appended claims. For example, the skew plates 53 and 153, as well as the eccentrics 56, 99, 173 and 185 may be replaced by suitable cam means.

I claim:

1. A machine comprising a supporting member, a main carriage supported on the member, means on the carriage for moving it along the member in intermittent steps, a sub-carriage supported by the main carriage, means on the main carriage for reciprocating the sub-carriage relative to the main carriage in a generally horizontal direction transverse to the direction of movement of the main carriage on the member, a torch carried by the sub-carriage, means on the main carriage for reciprocating the torch vertically relative to the sub-carriage, supply means on the main carriage for a fusible material, means carried by the sub-carriage for feeding the fusible material into proximity to the torch, means on the main carriage for intermittently operating the feeding means, a main drive shaft mounted rotatably on the carriage and operatively connected to all of said means, and drive means on the carriage for rotating the shaft, said means for reciprocating the sub-carriage comprising a skew plate fixed on the shaft and follower means fixed on the sub-carriage for engagement by the skew plate.

2. A machine as defined in claim 1 in which the means for moving the main carriage comprises a roller engaging the supporting member and means for rotating the roller.

3. A machine as defined in claim 1 in which the means for intermittently feeding the fusible material comprises a driving element freely rotatably mounted on the shaft, clutch means slidably mounted on the shaft for rotation therewith, and a shifting member fixed on the sub-carriage for engaging the clutch with said driving element on one stroke of the sub-carriage and for disengaging the clutch from said driving element on the other stroke thereof.

4. A machine as defined in claim 1 in which the shaft extends generally horizontally and transversely of the direction of travel of the main carriage and the sub-carriage comprises a sleeve axially slidably mounted on said shaft for rotation therewith.

5. A machine as defined in claim 1 in which the follower means comprises a roller mounted on a fixed axis, and resilient means for urging the skew plate against said roller.

6. A machine as defined in claim 4 in which the sub-carriage is suspended on said sleeve by means of bearings spaced axially therealong, and the means for reciprocating the torch vertically comprises a cam fixed on said sleeve between said bearings.

7. A machine as defined in claim 5 in which the means for moving the main carriage comprises a rack on the supporting member, a gear rotatably carried by the main carriage for meshing with the rack, and an operative connection between said shaft and the gear comprising an eccentric, a one-way driving connection, and a clutch for selectively engaging and disengaging the operative connection.

(References on following page)

References Cited in the file of this patent

UNITED STATES PATENTS

| | | |
|---|---|---|
| 1,477,538 | Carter et al. | Dec. 18, 1923 |
| 1,508,690 | Glasser | Sept. 16, 1924 |
| 1,580,020 | Cutler et al. | Apr. 6, 1926 |
| 1,740,033 | Pickney | Dec. 17, 1929 |
| 1,751,077 | D'Ardenne et al. | Mar. 18, 1930 |
| 1,878,136 | Hasse et al. | Sept. 20, 1932 |
| 1,938,819 | Eskilson | Dec. 12, 1933 |
| 1,956,406 | Vars | Apr. 24, 1934 |
| 1,971,822 | Klein | Aug. 28, 1934 |
| 2,267,296 | Bennewitz et al. | Dec. 23, 1941 |
| 2,295,702 | Wissler | Sept. 15, 1942 |
| 2,403,221 | Howard | July 2, 1946 |
| 2,505,054 | McElrath et al. | Apr. 25, 1950 |
| 2,524,896 | Downing | Oct. 10, 1950 |